US007190867B2

(12) United States Patent
Johnson et al.

(10) Patent No.: US 7,190,867 B2
(45) Date of Patent: Mar. 13, 2007

(54) FUNCTIONALLY STRAINED OPTICAL FIBERS (75) Inventors: Christopher L. Johnson, Granite Falls, NC (US); Nicholas V. Nechitailo, Conover, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/092,626

(22) Filed: Mar. 30, 2005

(65) Prior Publication Data
US 2005/0185904 A1    Aug. 25, 2005

Related U.S. Application Data (60) Division of application No. 10/139,225, filed on May 7, 2002, now Pat. No. 6,898,355, which is a continuation-in-part of application No. 09/916,327, filed on Jul. 30, 2001, now abandoned.

(51) Int. Cl.
G02B 6/44    (2006.01)
(52) U.S. Cl. ........................................... 385/114
(58) Field of Classification Search ................ 385/114, 385/109–110, 113, 106, 128, 12–14, 139–142
See application file for complete search history.

(56) References Cited

U.S. PATENT DOCUMENTS

| | | | |
|---|---|---|---|
| 4,635,430 A | 1/1987 | Missout et al. |
| 4,757,675 A | 7/1988 | Oglesby et al. |
| 4,787,702 A | 11/1988 | Khalil |
| 4,805,392 A | 2/1989 | Seveso et al. |
| 4,833,871 A | 5/1989 | Ogawa et al. |
| 5,029,816 A | 7/1991 | Langston |
| 5,331,796 A | 7/1994 | Varga |
| 5,487,261 A | 1/1996 | Varga |
| 5,531,064 A | 7/1996 | Sawano et al. |
| 5,608,832 A | 3/1997 | Pfandl et al. |
| 5,621,842 A | 4/1997 | Keller |
| 5,651,082 A | 7/1997 | Eoll |

(Continued)

Primary Examiner—J. F. Duverne
(74) Attorney, Agent, or Firm—Sughrue Mion, PLLC (57) ABSTRACT The present invention introduces a concept of "smart" ribbons, which use functionally tensioned optical fibers during the manufacture of fiber optic ribbons to create fiber ribbons with controlled geometrical configuration, optimized strain distribution and reduced attenuation. The ribbons may have flat or bowed cross section and be straight along the length or curved in its plane, or twisted unidirectionally, or periodically. These shapes and residual stress-strain state are induced and controlled by using tension functions instead of traditional constant-value tension per fiber during the ribbon manufacture. Further, the present invention reduces signal loss and/or attenuation in ribbon fibers caused by an increase in the strain variation from tensile strain to compressive strain along the length of the individual fibers when ribbons are manufactured, stacked, stranded around a strength member or twisted and bent during cable installation. In a first embodiment of the present invention, either a symmetric or non-symmetric load distribution is applied across the fibers being placed or drawn into a ribbon structure to eliminate or control residual twist in a completed fiber ribbon. Additionally, in the present invention, the load distribution on the fibers of a ribbon can be varied (e.g. periodically changed) along the length of the ribbon to provide a ribbon with the required design characteristics for any particular application. In a second embodiment of the invention, a fiber optic ribbon is made up of a plurality of sub-unit ribbons arranged in substantially the same plane. Each sub-unit ribbon includes a plurality of optical fibers coated by sub-unit matrices.

23 Claims, 9 Drawing Sheets

U.S. PATENT DOCUMENTS

| | | |
|---|---|---|
| 5,761,363 A | 6/1998 | Mills |
| 5,768,460 A | 6/1998 | Levi et al. |
| 5,809,195 A | 9/1998 | Brown et al. |
| 5,905,835 A | 5/1999 | Bourghelle et al. |
| 6,028,976 A | 2/2000 | Sato et al. |
| 6,072,922 A | 6/2000 | Albin et al. |
| 6,237,316 B1 | 5/2001 | Saito et al. |
| 6,256,090 B1 * | 7/2001 | Chen et al. ............... 356/73.1 |
| 6,321,013 B1 | 11/2001 | Hardwick, III et al. |
| 6,898,355 B2 * | 5/2005 | Johnson et al. ............ 385/114 |
| 2005/0112396 A1 * | 5/2005 | Sue et al. .................. 428/549 |

* cited by examiner

FUNCTIONALLY STRAINED OPTICAL FIBERS

This is a divisional of application Ser. No. 10/139,225 filed May 7, 2002, now U.S. Pat. No. 6,898,355 which is a Continuation-in-Part of U.S. application Ser. No. 09/916,327 filed Jul. 30, 2001, now abandoned, the disclosures of which are incorporated herein by reference.

FIELD OF THE INVENTION

The present invention generally relates to the field of optical fibers, in particular to the manufacture of fiber optic ribbons with functionally tensioned fibers to form ribbons with controlled geometrical configuration, optimized strain distribution and reduced attenuation. This invention introduces a new concept of "smart" ribbon which may have flat or bowed cross section and is straight along the length or curved in its plane, or twisted unidirectionally, or periodically. These shapes and residual stress-strain states are induced and controlled by using tension functions instead of traditional constant-value tension per fiber during the ribbon manufacture.

DISCUSSION OF RELATED ART

Optical fibers are very small diameter glass strands which are capable of transmitting an optical signal over great distances, at high speeds, and with relatively low signal loss as compared to standard wire or wire cable networks. The use of optical fibers in today's technology has developed into many widespread areas, such as: medicine, aviation, communications, etc. Most applications of optical fibers require the individual fibers to be placed into groupings, such as in fiber optic cables.

There are many ways to manufacture and configure fiber optic cables. One of the most common forms is the use of fiber optic ribbons. A fiber optic ribbon is created when several individually insulated fibers are aligned side-by-side and then covered with a protective coating or matrix. This results in a fixed geometry flat fiber optic ribbon bundle (as opposed to a loose bundle) which has the optical fibers held in positions parallel to each other in the same plane.

However, even though the use of the fiber optic ribbon is one of the most common ways optical fibers are employed in cables, and great advancements have been made in the use and methods of manufacturing ribbons, their manufacture is still not without problems. One of the most significant problems existing in current ribbons is the presence of uncontrolled residual twist in the ribbons after the ribbonizing process. Residual twist results in the ribbons not lying flat on flat surface or otherwise having geometric imperfections comprising the geometry of the ribbon. The presence of this residual twist has a number of adverse consequences, such as making it difficult to accurately align the individual fibers in a ribbon when two ribbons are being spliced. Fiber splicing is extremely sensitive to the geometrical imperfections existing in a ribbon, and imperfections that stem from residual twist make accurate splicing very difficult.

Another problem associated with residual twist is its adverse affect in the manufacture of fiber optic cables using ribbon stacks. Ribbon stacks are commonly made of a number of individual fiber ribbons which are twisted together in a helical pattern for integrity of the ribbon stack. The presence of residual twist in the ribbons can create fiber attenuation when the residual twist of the individual ribbon is contrary to the twist patterns of the ribbon stack. This is particularly evident in the fibers which are positioned on the edges of the individual ribbons, which have a minimum radius of curvature and undergo large amounts of tension when twisted in a ribbon stack.

Another problem which exists in current ribbon manufacturing techniques is the uneven distribution of excess fiber length (EFL) in a ribbon. EFL is a ratio of individual fiber length compared to the actual length of the ribbon, length of the stack or cable length. It is generally desirable to have the individual fibers slightly longer than the cable or housing ribbon stack buffer tube or, in the case of an individual ribbon, the ribbon matrix material to prevent the individual fibers from tensile strain when the cable or ribbon itself is under a tensile load. It is highly desirable that the EFL of each fiber in a ribbon provide for close to zero residual strain to ensure minimum attenuation. However, under current manufacturing techniques it is found that the EFL distribution across an individual ribbon is uneven, where, for example, the edge fibers in a ribbon have a negative EFL because they have a residual tensile load, while the central fibers have a positive EFL because they have a residual compression load.

A further problem with current fibers, associated with above uneven EFL distributions, is the residual strains in the individual fibers after ribbon manufacture. These residual strains although by themselves may not cause a problem, when coupled with strains from the creation of a ribbon stack or through installation may cause additional tensile strain in the outer fibers while also causing additional compression strain in the central fibers. This can lead to signal loss and attenuation, delamination and buckling in the fibers and ribbons, all of which should be avoided.

Of course all of the above mentioned problems are magnified when not only are the ribbons curved or bent when placed in a cable, but when the cable itself is bent or curved during installation and handling.

Figure 1:
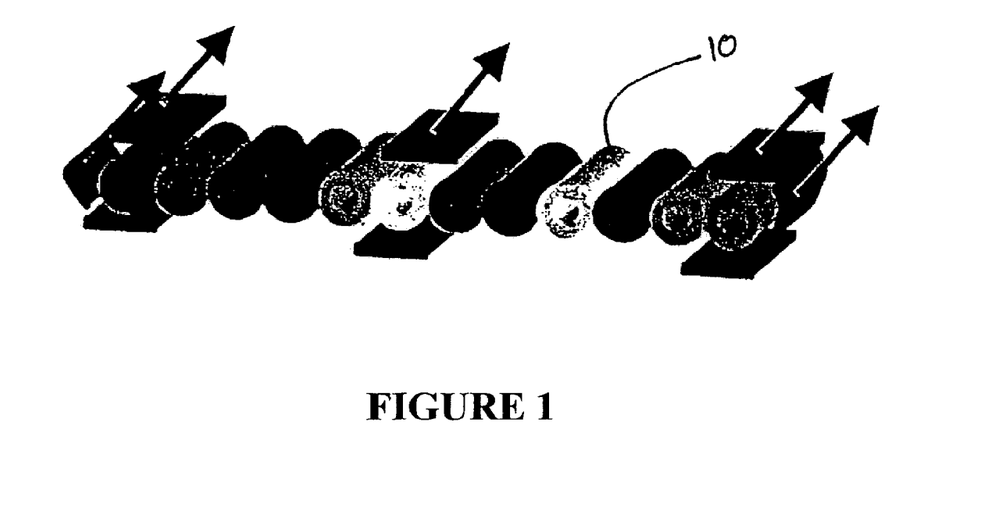
FIG. 1 is a diagrammatic representation of a fiber optic ribbon without the matrix material, during ribbon manufacture showing representative forces experience during ribbon manufacture.

It is believed that a large source for the above problems comes during the manufacturing phase of the ribbons, where different individual fibers being placed into a single ribbon undergo different forces and stresses caused by imbalances between the pulling and friction forces across a ribbon width, resulting in uneven stress and strain distributions across a single ribbon. Current ribbon manufacturing procedures use an equal tensile force (for example 80 grams) on each fiber being drawn into a ribbon. However, while the ribbon is being manufactured each of the fibers, in a ribbon, are undergoing different forces. These different forces result in the uneven stress and strain distributions, and the problems discussed above. One cause for the uneven stress distribution could be the location of the fibers. For example, the outer edge fibers (outermost two) have a higher contact area with the ribbon manufacturing equipment than the central fibers. This is depicted in FIG. 1, which shows twelve individual fibers 10 as they would appear in ribbon matrix material (not shown). This Figure shows that the outermost ribbons have more surface contact area (contact on 3 sides) than central fibers (contact on only 2 sides) and thus would experience more drag or friction forces during manufacture, resulting in the creation of a residual tensile strain in the fibers. These friction forces are material, time and temperature dependant, and include variables such as the line speed of the ribbon manufacture process, the thickness of the ribbon matrix material, and the kinematic viscosity of the matrix material. Additionally, other factors such as ribbon material microstructure and thermal processing regime, including position and intensity of the heat source, also influence the difference in the friction forces on the edges and in the middle of the ribbon.

SUMMARY OF THE INVENTION

The present invention is directed to eliminating or greatly reducing the impact of the above problems by the use of non-uniform tensile loads on individual fibers during the ribbonizing process to adjust or alter the strain and EFL in the fibers and to create flat or geometrically stable curved ribbons with optimized strain distribution and reduced attenuation. This invention introduces a new concept of "smart" ribbon which may have flat or bowed cross section and is straight along the length or curved in its plane, or twisted unidirectionally, or periodically. These residual shapes and residual stress-strain states are induced and controlled by using tension functions instead of traditional constant-value tension per fiber during the ribbon manufacture. Also, these shapes and strain state are compliant with the subsequent ribbon configurations when the ribbons are stacked together, placed in a buffer tube and stranded around a central strength member or installed in the slots of a given geometry. The concept of the "smart" ribbon is based on the "round" strain functions:

$$\epsilon(r,\theta)=\epsilon(r),$$

where $\epsilon$ is the normal strain along the fiber length, r is the distance from the geometrical center of the ribbon stack to the fiber, and $\Theta$ is the polar angle. According to the concept of this invention, the strain in the fiber should not change with the change in its angular position around the center of the stack. Also, it is often desirable to create a ribbon stack with close to zero strain distribution along the radius, from the center to the corner fibers. In practical situations, it is desirable to minimize variation in the tensile strain (typically high in the corners) and compressive strain (typically high in the middle) of the ribbon stack. This task becomes increasingly difficult using the traditional constant tension per fiber approach, especially for the large ribbons and ribbon stacks. Thus, this invention teaches how to apply non-constant tension to achieve an optimal strain distribution in the ribbons and subsequently ribbon stacks. The strain-tailoring techniques can be applied to create optimal-strain, low-attenuation cables for expected thermo-mechanical load conditions.

In a first embodiment of the present invention, different tensile loads are applied to different fibers being placed in a single ribbon, during manufacture of the ribbon, to allow the geometric stability of the ribbon to be controlled or optimized. Different functional distributions of tensile forces can be used, including: (1) parabolic or sinusoidal distribution with a smaller tensile load being applied to the outermost fibers and a higher load being applied to the central fibers; (2) trapezoidal distribution of tension with a smaller tension on the outer most fibers and a higher constant-level tension on the central fibers; and (3) a hybrid parabolic-trapezoidal or sinusoidal-parabolic distribution having a rapid change in tensile force on the edge fibers as they progress in from the edge, with a shallow tensile load function for the central fibers. The present invention can be used to achieve both a flat ribbon, as desirable for splicing, or a fiber ribbon with a controlled non-flat shape or configuration depending on the application in which the ribbon is to be used. For example, ribbons can be produced where the outermost fibers have an increased EFL for better signal performance after being twisted, helically or otherwise stranded. The increased EFL will prevent the problems normally experienced in the outermost fibers due to high tensile strain when the whole ribbon stack is twisted.

Further, the present invention may also be used to create non-straight ribbons with in-plane controllable curvature. This is accomplished by using a non-symmetric tensile load function to define the tensile loads on the fibers across a ribbon being manufactured. The intentional and controlled creation of this residual curvature with a non-symmetric fiber load distribution can be efficiently used for creating controlled ribbon twist and stranding around a cable strength member in a curvilinear path (i.e. helical path), while avoiding the problems associated with the creation of high residual stresses and strains when the prior art methods of manufacture are used.

In a second embodiment of the invention, a fiber optic ribbon is made up a plurality of a plurality of sub-unit ribbons arranged in substantially the same plane. Each sub-unit ribbon includes a plurality of optical fibers coated by sub-unit matrices. The sub-unit ribbons are then encased in a common matrix material. Before the optical fibers are encased in the common matrix material, the fibers within each sub-unit are provided with a constant tension force. A first tension load applied to at least one of the sub-unit ribbons is different than a second tension load applied to one of the other sub-unit ribbons. This difference in tension load applied to the ribbon sub-units before they are encased in the common matrix produces a fiber optic ribbon assembly in which at least one sub-unit ribbon has first pre-strain that is different from a second pre-strain of at least one of the other sub-unit ribbons.

BRIEF DESCRIPTION OF THE DRAWINGS

The advantages, nature and various additional features of the invention will appear more fully upon consideration of the illustrative embodiments of the invention which are schematically set forth in the drawings, in which.

DETAILED DESCRIPTION OF THE INVENTION

The present invention will be explained in further detail by making reference to the accompanying drawings, which do not limit the scope of the invention in any way.

Figure 2A:
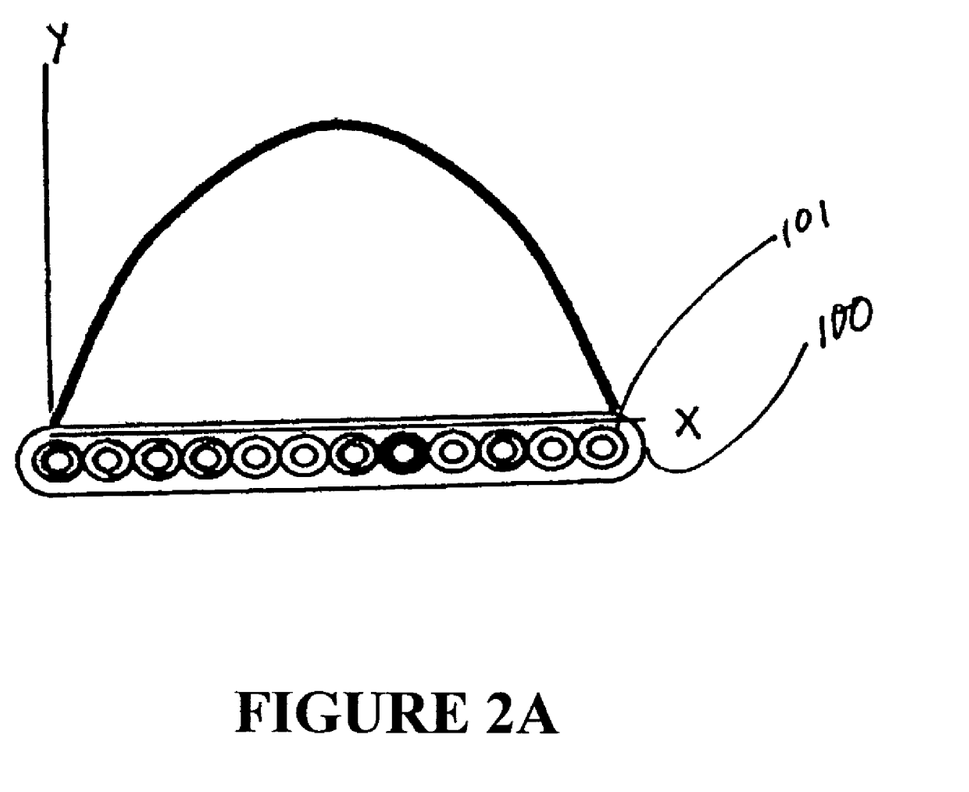
FIG. 2A is a diagrammatic representation of a symmetric parabolic or sinusoidal strain distribution over a typical fiber optic ribbon as contemplated by the present invention.

Turning now to FIGS. 2A through 2E, in a first embodiment of the invention various tension functions for fiber stress during ribbon manufacture are shown. In FIG. 2A, a typical fiber optic ribbon 100 is shown along the X-axis of a graph, having a plurality (twelve) optical fibers 101. The Y-axis of the graph represents the tensile force applied to the individual optical fibers along the width of the fiber during manufacture. In this Figure, a symmetric parabolic or sinusoidal curve is shown where the tensile load on the end fibers is less than that on the center most fibers, while the fibers are being drawn. In the preferred embodiment of the present invention, the exact tensile load values and the function of the distribution over the fibers should be such as to result in a flat or otherwise geometrically stable ribbon after manufacture. Therefore, the exact loads and distribution to be used is to be tailored to the particular manufacturing process being used, because no one load distribution would be applicable for different manufacturing variations. Examples of factors to be taken into account when determining the proper load distribution are line speed of the ribbon manufacture process, the thickness of the ribbon matrix material, and the kinematic viscosity of the matrix material, as well as temperature, and time and location of curing stations. Although it is desirable to have a flat ribbon for geometric stability and the optimization of fiber spacing for splicing, it is contemplated that the parabolic or sinusoidal function can be modified or altered in any way to create a ribbon with the desired characteristics such as controlled residual twist or fiber strain.

Figure 2B:
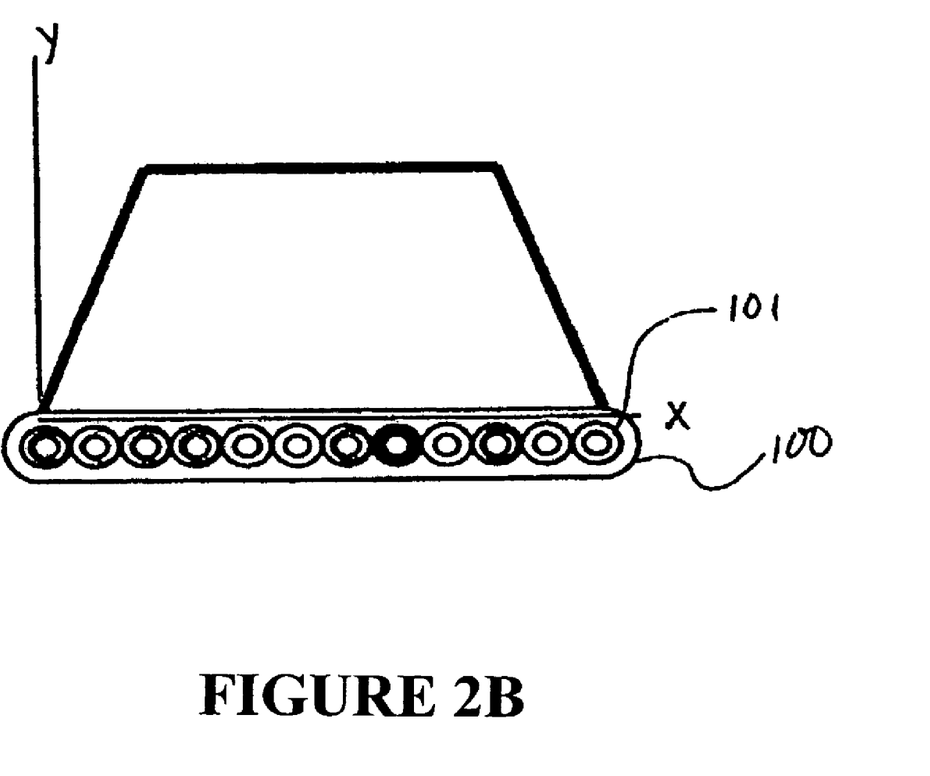
FIG. 2B is a diagrammatic representation of a symmetric trapezoidal strain distribution over a typical fiber optic ribbon as contemplated by the present invention.

FIG. 2B is similar to FIG. 2A except that a symmetric trapezoidal load distribution is shown. Such a distribution may also result in a flat or otherwise geometrically stable fiber ribbon, depending on the load function used and the manufacturing parameters. However, unlike the distribution in FIG. 2A, this distribution applies an even load along the center most fibers (instead of varying the load with a peak load at the center). This distribution can be used as easier to use, alternative to the parabolic or sinusoidal distribution previously discussed. This is because the central fibers all use the same load, thus simplifying the apparatus and method.

Figure 2C:
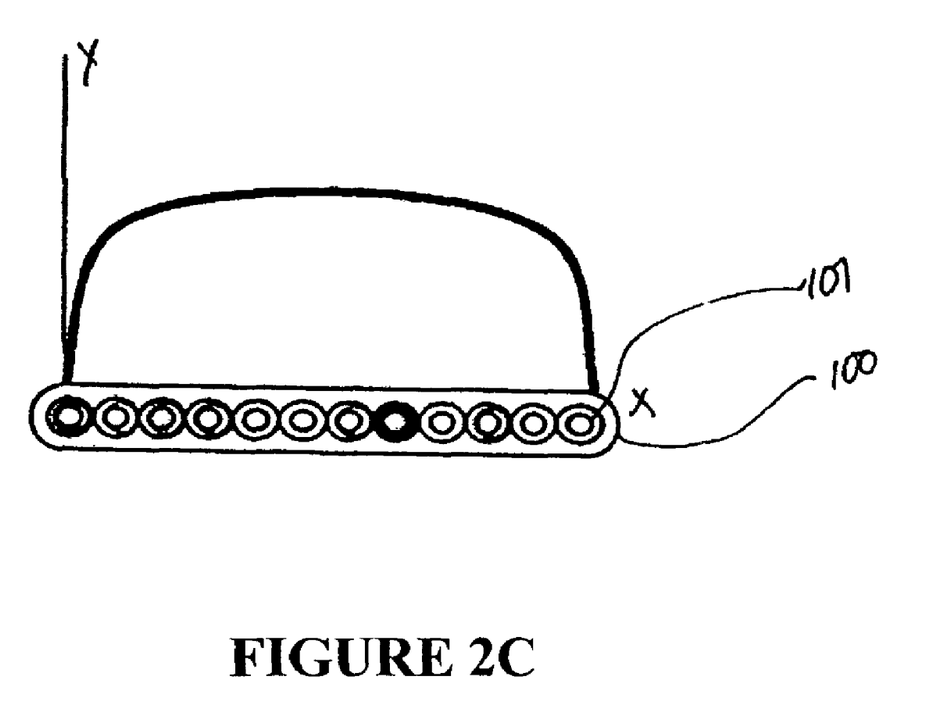
FIG. 2C is a diagrammatic representation of a symmetric hybrid parabolic-trapezoidal or sinusoidal-trapezoidal strain distribution over a typical fiber optic ribbon as contemplated by the present invention.

FIG. 2C shows a hybrid symmetric load distribution which can be either a hybrid between parabolic and trapezoidal functions or between sinusoidal and trapezoidal functions. Again, in the preferred embodiment, the distribution across the ribbon would be symmetric and result in a flat geometrically stable ribbon. However, as with the previous embodiments the load function can be altered or modified as required by the application of the ribbon to optimize or minimize ribbon strain and stress in the various intended ribbon applications.

It should be noted that although the figures above show the outermost fibers having lower loads than the central fibers, it is contemplated that the reverse can also be used. It may be desirable, in certain applications, to have lower/higher EFL in the outermost fibers, thus during the manufacture of the ribbon a higher/lower load may be used on the outermost fibers. This would be applicable when a higher EFL is needed for outer fibers in ribbons that are going to be wound or bent in the manufacture of a cable, or during any other installation. This is because during the bending or winding of ribbons, the outermost fibers undergo or experience the highest tensile loads (because they must stretch the furthest distance), therefore, an increased EFL in these fibers would allow the fibers to "give" as the ribbon in which they are in is stretched without increasing the strain (and subsequently attenuation) in the fibers.

Further, in addition to flat ribbons, it may be desirable to have a bowed ribbon, where either the center (or the ends) are desired to "bow" forming an arch cross section. If this configuration is desirable, the above functions can be modified to create such a ribbon configuration. However, it should be further noted that the above functions are only intended for use on ribbons when it is desired that the ribbon be symmetrical.

Figure 2D:
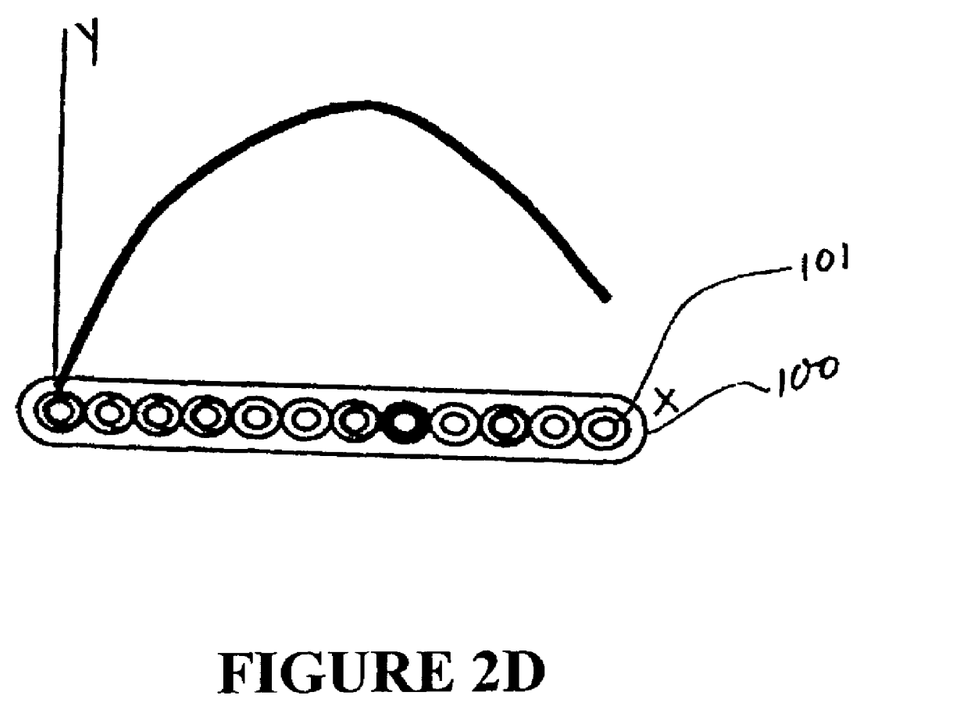
FIG. 2D is a diagrammatic representation of a non-symmetric parabolic or sinusoidal strain distribution over a typical fiber optic ribbon as contemplated by the present invention.
Figure 2E:
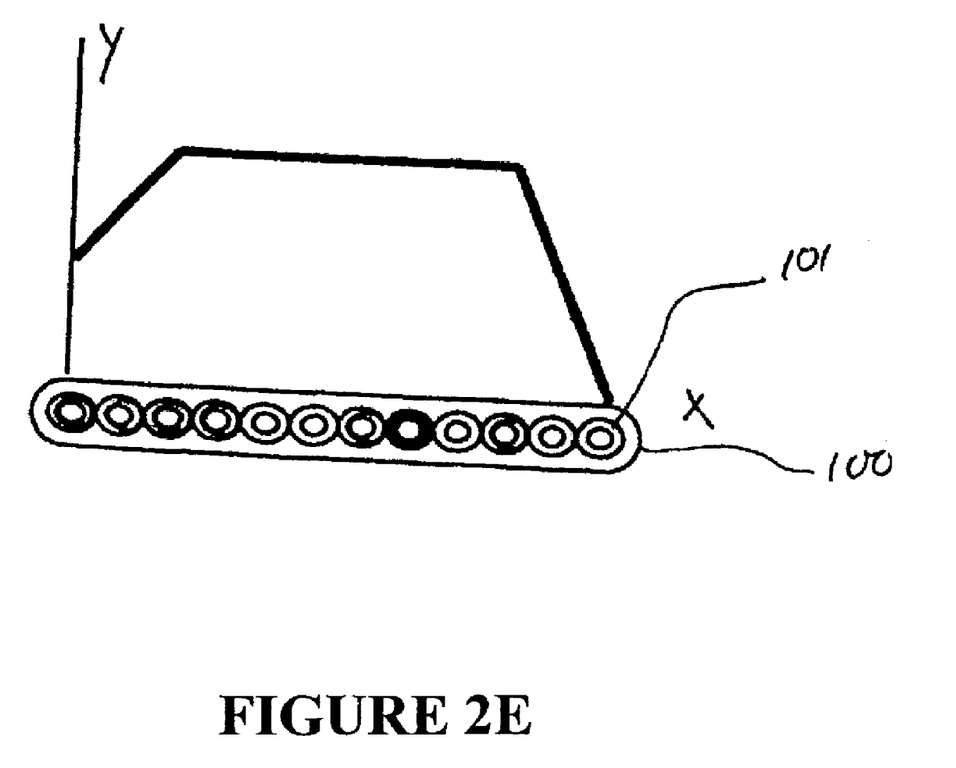
FIG. 2E is a diagrammatic representation of a non-symmetric trapezoidal strain distribution over a typical fiber optic ribbon as contemplated by the present invention.

FIGS. 2D and 2E are directed to the creation of non-symmetrical ribbons. In particular, FIG. 2D shows a non-symmetrical parabolic or sinusoidal load function, where the left most fiber has a lower applied load then the right most fiber. This distribution would result in a clockwise in-plane residual turn and twist in the ribbon. Such a controlled curvature allows the manufacture of pre-twisted ribbons that can be used in cable application where the ribbons would normally be twisted or stranded as a stack of ribbons. The pre-twisting of the ribbons allows the ribbons to be placed into a twisted helical cable pattern, for example, without the outermost fibers experiencing the same tensile strain that would normally be experienced by a straight ribbon. If the ribbon is pre-shaped to follow the helical path it would follow when installed into a ribbon stack and placed in the slotted core or placed in the buffer tube subsequently stranded around a central strength member, then little or no strain is added to the fibers when the ribbon is in fact installed.

Another example of this non-symmetric loading of the fibers during the ribbonizing process is shown in FIG. 2E, which shows a non-symmetric trapezoidal loading configuration with more load being applied to the left most fiber than the right most fiber. This load distribution results in a counter-clockwise twist and in-plane bend in the completed ribbon.

It should be noted that the load distribution function used to define the loads for each fiber are to be determined by the ultimate application, and desired characteristics of the ribbon and individual fibers. The functions shown in FIGS. 2A through 2E are merely examples of functions that can be used, and the present invention contemplates and includes the use of many different functions, not shown, including but not limited to combinations of the above discussed functions. Further, it is noted that the present invention contemplates changing the applied load distribution on the fibers in a single ribbon during the ribbonizing process. Although most ribbon applications would require a finished ribbon with a constant geometry throughout its length, whether it be flat or bowed, or curved, in some applications it may be desirable to have the geometry of the ribbon change throughout the length of the ribbon.

Figure 3:
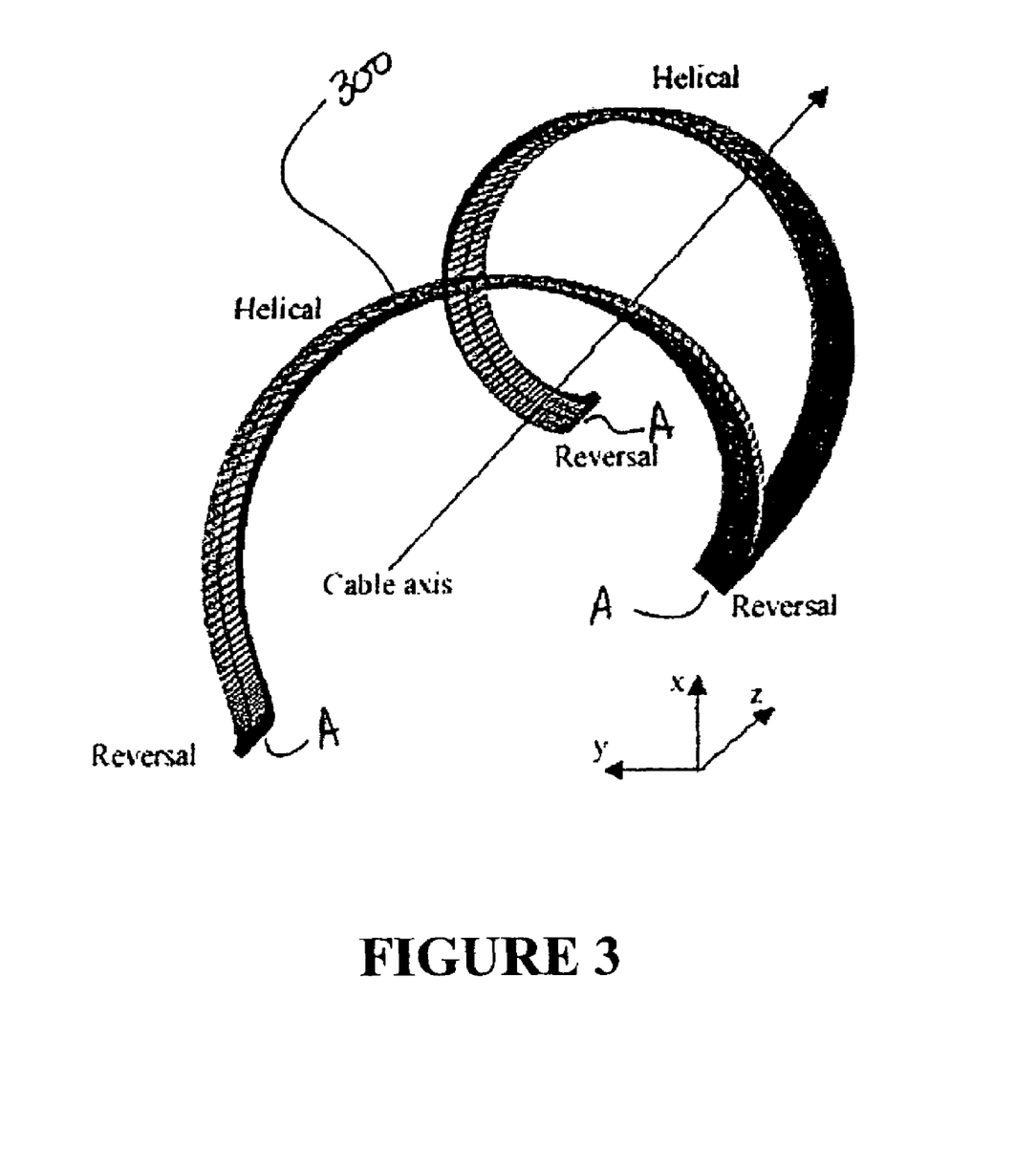
FIG. 3 is a diagrammatic representation of a curvilinear stranded ribbon structure with reduced stress level using ribbons with in-plane curvature from non-symmetric fiber tensile forces during ribbon manufacture.

This is accomplished by changing the load function over time during the manufacture of a single ribbon. For example, it may be desirable to have a ribbon which begins with a clockwise twist, but transitions to a counter-clockwise twist at some point along its length and back again. To accomplish this the function shown in FIG. 2D may be used when the ribbon manufacture starts, and then the load distribution transitions to a function directly opposite of that shown in FIG. 2D, and perhaps back again. An example of a ribbon manufactured in this process is shown in FIG. 3. This Figure shows a plurality of ribbons 300 twisted in an in-plane curvilinear path along a cable axis where the twist of the ribbons 300 reverses at points A. The twist reversal is accomplished by changing the fiber load distribution as previously discussed. It is noted that such an in-plane curvilinear path is a result of using a non-symmetric load distribution, examples of which are shown in FIGS. 2D and 2E.

The following Table I provides a qualitative characterization of fiber strain loads or distribution in fiber ribbons made with various methodology to demonstrate the advantages of the present invention, where "+" indicates the creation (or addition) of fiber tensile strain, "−" indicates the creation (or addition) of compressive strain on the individual fibers, and "0" indicates the creation (or addition) of no additional strain. (Note "SM" indicates strength member).

As can be seen from the above Table, the optimum load distribution function to be used for any one particular ribbon greatly depends on the ribbons ultimate use and installation requirements. As previously stated, the load distribution functions can be changed and optimized throughout the length of an individual ribbon (or could be different for different ribbons used in a same stack) to achieve the most desirable results.

Further, although in the preferred embodiment of the present invention, the loads applied to the fibers during ribbonizing are controlled by varying the applied tension in the fibers, the loads can also be controlled by any other commonly known or used way, such as altering the friction loads of the various fibers as they are being pulled through the ribbon die. Managing the friction loads as the fiber pass through the ribbon die can be accomplished by, for example, varying the characteristics of the ribbon matrix material across the ribbon structure or non-uniform thermal curing regime. Altered characteristics can include viscosity, molecular structure, temperature, thickness, etc.

Figure 4:
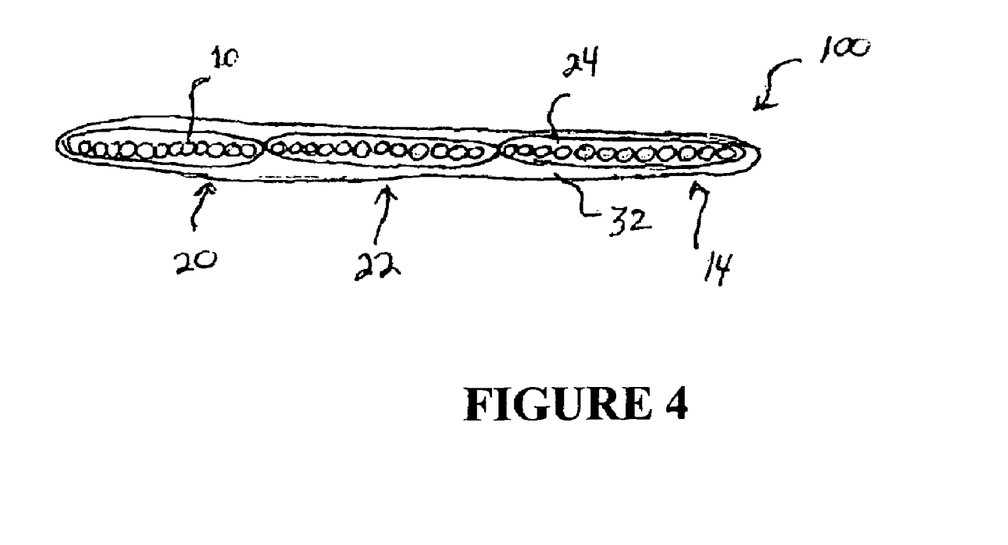
FIG. 4 is a cross-section of a fiber optic ribbon made up of three sub-unit ribbons.

As shown in FIG. 4, a second embodiment of the optical fiber ribbon 100 is made up of three sub-unit ribbons 20, 22, 24. Each sub-unit ribbon 20, 22, 24 is made up of a plurality of optical fibers 10. The optical fiber ribbons 10 of each sub-unit ribbon 20, 22, 24 are then each encased in a matrix material 30, such as a coating resin. The use of multiple sub-units ribbons 20, 22, 24 each encased in separate

| METHOD OF RIBBON MANUF. | STRAINS IN THE RIBBON AFTER RIBBONIZING PROCESS | STRAINS AFTER RIBBON STACK TWISTING | STRAINS AFTER RIBBON BENDING AROUND A SM | STRAINS AFTER CABLE BENDING AND TENSION | COMMENT |
|---|---|---|---|---|---|
| Flat Prior Art Ribbons Obtained using constant tension per each fiber | + edge fibers<br>− central fibers | + edge fibers<br>− central fibers | + edge fibers<br>0 central fibers | ++ edge fibers<br>+ central fibers | As can be seen the edge fibers experience + strain at each stage of manuf. and installation, thus ultimately creating significant strain and signal attenuation in the edge fibers. |
| Flat Ribbons made in accordance with the present invention. | 0 edge fibers<br>0 central fibers | + edge fibers<br>− central fibers | + edge fibers<br>0 central fibers | ++ edge fibers<br>+ central fibers | In this case the edge fibers experience less overall strain because no residual strain exists from the ribbonizing process. |
| Flat Ribbons with compressed edge fibers and tensioned central fibers. | − edge fibers<br>+ central fibers | + edge fibers<br>− central fibers | + edge fibers<br>0 central fibers | ++ edge fibers<br>+ central fibers | Here because the edge fibers begin with a residual compression strain, which partially compensates for the tensile strain experienced in the application of the ribbon, the overall tensile strain is reduced as compared to the above examples. |
| Twisted Ribbons with in-plane curvilinear shapes. | + left edge fiber<br>0 central fibers<br>− right edge fiber | 0 edge fibers<br>0 central fibers | 0 edge fibers<br>0 central fibers | ++ edge fibers<br>+ central fibers | As can be seen this configuration produces the lowest stress gradient in the fibers, because of the optimization of the in-plane curvature of the ribbon prevents additional strain from being added to the edge fibers during stack twist and ribbon stranding in buffer tube or slotted core. | matrices allows the optical fiber ribbon 100 to be split into the individual sub-unit ribbons 20, 22, 24, if necessary.

Next, each of the sub-unit ribbons 20, 22, 24 is pre-stretched by a tension load that is constant for the entire the sub-unit 10, 12, 14. These sub-unit ribbons 10, 12, 14 are then encased in a common matrix material 32 to form the final optical fiber ribbon 100.

Figure 5A:
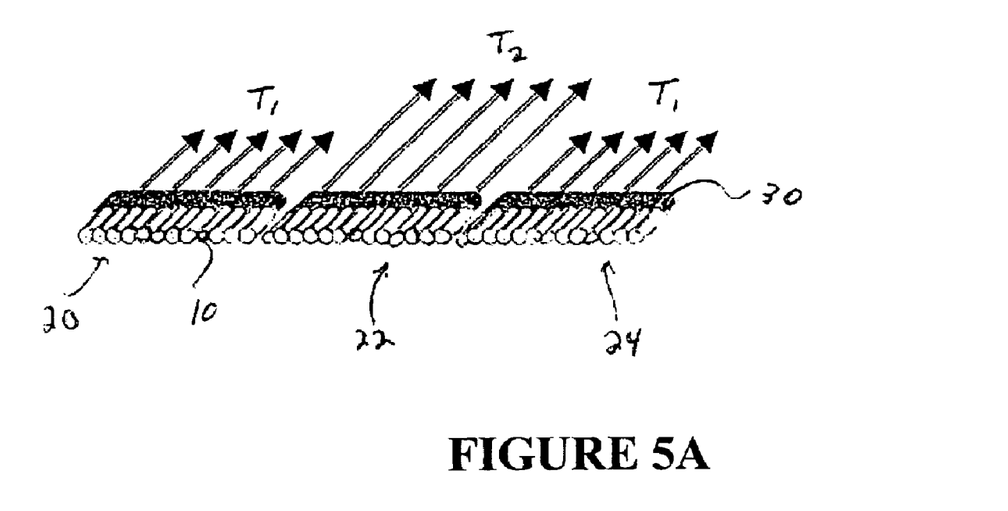
FIG. 5A is a diagrammatic representation of a fiber optic ribbon made up of three sub-unit ribbons, in which an increased tension force is applied to the central sub-unit ribbon.

As shown in FIG. 5A, in a first configuration, the individual sub-unit ribbons 20, 22, 24 are provided with symmetrical tension loads before they are encased to form the optical fiber ribbon 100. A first tension load $T_1$ is applied to both side sub-unit ribbons 20, 24, while a greater tension load $T_2$ is applied to the central sub-unit ribbon 22. This configuration provides a central sub-unit 22 that has a pre-strain that is greater than the pre-strain of the side sub-unit ribbons 20, 24. This configuration allows the central ribbon 22 to have an increased resistance to central compression strain. As was discussed above, during ribbon twist the outer fibers 10 of an optical fiber ribbon are stretched while the inner fibers 10 of the matrix are compressed.

Figure 5B:
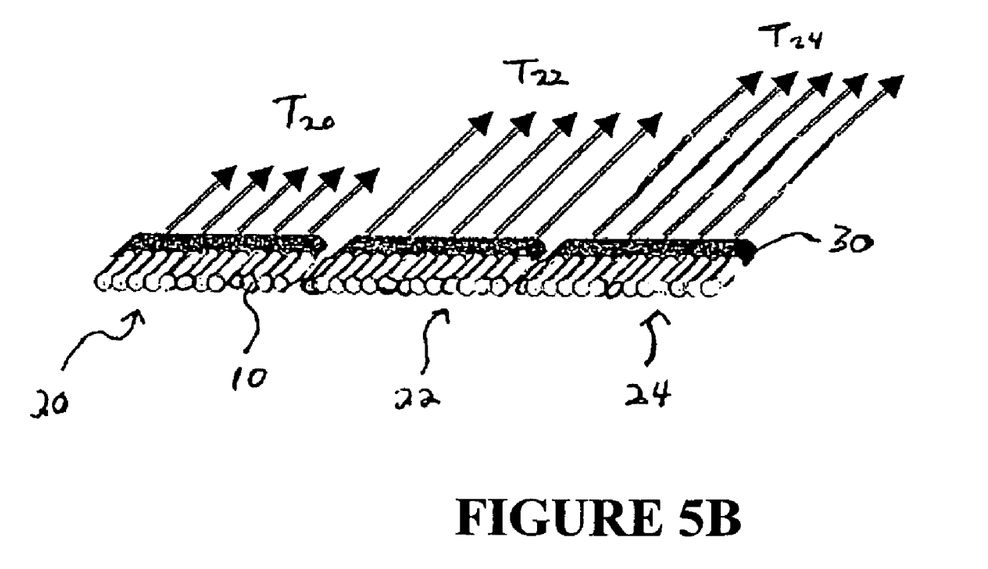
FIG. 5B is a diagrammatic representation of a fiber optic ribbon made up of three sub-unit ribbons, in which different tension forces are applied to each sub-unit ribbon.

As is shown in FIG. 5B, in a second configuration, the individual sub-unit ribbons 20, 22, 24 are provided with asymmetrical tension forces before they are encased to form the optical fiber ribbon 100. A first tension force $T_{20}$ is applied to the first sub-unit ribbon 20, a second greater tension force $T_{22}$ is applied to the second sub-unit ribbon 22, and a third even greater tension force $T_{24}$ is applied to the third sub-unit 24.

This configuration provides non-straight fiber optic ribbon assembly with in-plane controllable curvature. The intentional and controlled creation of this residual curvature by an asymmetric fiber load distribution creates ribbon twist and can be used for stranding the ribbons around a cable strength member in a curvilinear path, i.e., helical path.

Although the figures show a fiber optic ribbon assembly made up of 36 optical fiber ribbons, i.e., three sub-unit ribbons with 12 optical fibers each, the invention is not limited in this respect. Embodiments with additional sub-unit ribbons with varying numbers of optical fibers can be used. In fact, a two sub-unit ribbon can even be used to provide an asymmetric configuration similar to that of the second embodiment.

Note also that in addition to the configurations discussed above, it may be desirable, in certain applications, to make an optical fiber ribbon assembly with the sub-unit ribbons are configured in different ways, in which the pre-encasing tension force applied to at least one of the sub-unit ribbons is different than the pre-encasing tension force applied to one of the other sub-unit ribbons. These configurations could include, for example, an optical fiber ribbon assembly in which five or more sub-unit ribbons are provided with pre-stress forces that increase in steps from the sides to the center or are provided with pre-stress forces that increase according to complex functions from the sides to the center.

It is of course understood that departures can be made from the preferred embodiments of the invention by those of ordinary skill in the art without departing from the spirit and scope of the invention that is limited only by the following claims.

What is claimed is:

1. A method for manufacturing a fiber optic ribbon, the method comprising the steps of:

drawing a plurality of optical fibers through a fiber optic ribbon die such that said fibers are arranged substantially in the same plane;

applying a first load to at least one of said plurality of optical fibers and at least a second load to at least one other of said fibers, wherein said first load is different from said second load; and applying a coating to said plurality of fibers.

2. The method as claimed in claim 1, wherein said first load is applied to each fiber on an end of said plurality of fibers and said second load is applied to at least one of said plurality of said fibers not on an end of said plurality of fibers.

3. The method as claimed in claim 1, wherein said first load is applied to a fiber on one end of said plurality of fibers and said second load is applied to a fiber on another end of said plurality of fibers.

4. The method as claimed in claim 1, further applying at least a third load to at least another of said plurality of fibers.

5. The method as claimed in claim 1, wherein at least one of said first and second loads varies during said drawing step.

6. The method as claimed in claim 1, wherein at least one of said first and said second loads is determined from at least one fiber load distribution function.

7. The method as claimed in claim 6, wherein said function is parabolic.

8. The method as claimed in claim 6, wherein said function is sinusoidal.

9. The method as claimed in claim 6, wherein said function is trapezoidal.

10. The method as claimed in claim 6, wherein said function is a combination of any two functions chosen from a group consisting of parabolic, sinusoidal and trapezoidal.

11. The method as claimed in claim 6, wherein said function provides a symmetric load distribution across said plurality of fibers.

12. The method as claimed in claim 6, wherein said function provides a non-symmetric load distribution across said plurality of fibers.

13. The method as claimed in claim 6, further comprising drawing the plurality of fibers through a fiber optic ribbon die, wherein said function changes during said drawing step.

14. The method as claimed in claim 1, wherein said first and second loads are applied such that said ribbon lies substantially flat on a substantially flat surface.

15. The method as claimed in claim 1, wherein said first and second loads are applied such that said ribbon twists along its length.

16. A fiber optic ribbon made by the method claimed in claim 1.

17. A fiber optic ribbon made by the method claimed in claim 6.

18. The method as claimed in claim 1, wherein the step of applying a first load to at least one of a plurality of optical fibers arranged in substantially the same plane and at least a second load to at least one other of said fibers, includes:

forming a plurality of sub-unit ribbons, each sub-unit ribbon including at least two of the plurality of optical fibers, by applying a sub-unit coating to the plurality of optical fibers; and applying the first load to at least one of the plurality of sub-unit ribbons and the second load to at least one other of the plurality of sub-unit ribbons.

19. The method as claimed in claim 1, wherein the first load is applied to a central sub-unit ribbon.

20. The method as claimed in claim 19, wherein the second load is applied to at least two other sub-unit ribbons.

21. The method as claimed in claim 18, wherein the first load is greater than the second load.

22. The method as claimed in claim 19, wherein the first load is greater than the second load.

23. The method as claimed in claim 20, wherein the first load is greater than the second load.

* * * * *